United States Patent
Hawkins

(10) Patent No.: US 7,657,698 B2
(45) Date of Patent: Feb. 2, 2010

(54) SYSTEMS AND METHODS FOR CHASSIS IDENTIFICATION

(75) Inventor: Pete A. Hawkins, San Luis Obispo, CA (US)

(73) Assignee: Intel Corporation, Santa Clara, CA (US)

( * ) Notice: Subject to any disclaimer, the term of this patent is extended or adjusted under 35 U.S.C. 154(b) by 580 days.

(21) Appl. No.: 11/166,452

(22) Filed: Jun. 23, 2005

(65) Prior Publication Data

US 2005/0251591 A1 Nov. 10, 2005

Related U.S. Application Data

(62) Division of application No. 10/138,971, filed on May 2, 2002, now Pat. No. 6,925,540.

(51) Int. Cl.
 G06F 12/00 (2006.01)
 G06F 13/00 (2006.01)
(52) U.S. Cl. .................. 711/103; 711/100; 711/154
(58) Field of Classification Search ........... 711/100, 711/103, 114, 115, 154, 156, 161, 162; 714/45, 714/723; 365/185.33
See application file for complete search history.

(56) References Cited

U.S. PATENT DOCUMENTS

| | | | | |
|---|---|---|---|---|
| 5,987,611 A * | 11/1999 | Freund | ........................... | 726/4 |
| 6,073,251 A | 6/2000 | Jewett et al. | | |
| 6,199,173 B1 * | 3/2001 | Johnson et al. | ................ | 714/4 |
| 6,266,721 B1 * | 7/2001 | Sheikh et al. | ................ | 710/100 |
| 6,449,699 B2 * | 9/2002 | Franke et al. | ................ | 711/147 |
| 6,463,513 B1 * | 10/2002 | Bish et al. | .................... | 711/161 |
| 6,625,703 B2 | 9/2003 | Goodman et al. | | |
| 6,662,268 B1 | 12/2003 | McBrearty et al. | | |
| 2002/0165961 A1 * | 11/2002 | Everdell et al. | ............. | 709/225 |
| 2003/0120822 A1 * | 6/2003 | Langrind et al. | ............. | 709/251 |
| 2005/0044403 A1 * | 2/2005 | Kim | ........................... | 713/200 |
| 2006/0129747 A1 * | 6/2006 | Weber et al. | ................ | 711/100 |

* cited by examiner

*Primary Examiner*—Tuan V. Thai
(74) *Attorney, Agent, or Firm*—Blakely, Sokoloff, Taylor & Zafman LLP

(57) ABSTRACT

A identification system comprising at least one non-volatile memory device containing identification data, a communication bus for the memory device that is independent of any other system bus, and a controller to manage the integrity of the identification data.

14 Claims, 3 Drawing Sheets

SYSTEMS AND METHODS FOR CHASSIS IDENTIFICATION

This U.S. Patent application is a divisional of U.S. patent application Ser. No. 10/138,971 filed May 2, 2002 now U.S. Pat. No. 6,925,540.

BACKGROUND OF THE INVENTION

1. Field of the Invention

The invention relates generally to the field of high availability electronic systems, and, more specifically, to the identification of chassis within such systems.

2. Background of the Invention

High availability systems are presently used in applications where systems are required to operate with little or no interruption of service. The telecommunications and data markets, for example, have many applications for high availability systems including central office switches, private branch exchanges (PBX), internet routers, and digital subscriber loops (DSL). Standards have been developed to facilitate communication between high availability system components built by different manufacturers.

One example of a prior art high availability system is CompactPCI. Standards for CompactPCI products are agreed to by PCI Industrial Computers Manufacturers Group (PICMG). A CompactPCI product has, among other things, a metal cover that encloses a chassis, a backplane, and slots for printed circuit boards that perform specific applications. A general description of CompactPCI can be found in PICMG 2.0 R2.1, CompactPCI Specification Short Form, published Sep. 2, 1997. A more complete description of CompactPCI can be found in PICMG 2.0 R3.0, CompactPCI Specification, published Oct. 1, 1999. Any system component that can be replaced in the field by a technician is known by one of ordinary skill in the art as a Field Replaceable Unit (FRU). In a high availability system there are, typically, mechanisms for compensating for a failure, such as, for example, redundancy. When an FRU (component or a circuit board) fails within a high availability system that has been placed in the field, it is important to notify a service provider of the failure so that the system can be repaired.

In telecommunications applications, for example, a company may have thousands of unattended systems deployed in racks all over the world. Furthermore, there may be many different chassis stacked in these racks. Before a service provider can send a technician to repair a failure, more must be communicated than simply the fact that a failure has occurred somewhere in the field. The identity of the failed chassis must be determined. A prior art means for identifying a failed chassis is disclosed in the Intelligent Platform Management Interface (IPMI) Specification version 1.5, published Feb. 21, 2001. Permission to license the IPMI specification document can be obtained from Intel Corp., Hewlett-Packard Company, NEC Corp., and Dell Computer Corp.

A product complying with IPMI may have an identification module having an Electrically Erasable Programmable Read Only Memory (EEPROM) that contains at least some identifying information that is unique to the chassis. The data stored in the EEPROM is called the chassis information. An EEPROM used to store the chassis information is called the FRU memory device (the FRU term denotes that the memory device is replaceable in the field). The chassis information is written to the EEPROM at the factory may include, among other things, the chassis serial number, date of manufacture, model number, vendor information, and product number. Blank fields may also be available for the end user to write other identification information that may be useful, such as a string or text describing the geographical location of the chassis. If a failure occurs, information about the failure is typically transmitted to a monitoring center along with the information stored in the FRU memory device.

Referring to FIG. 1, a chassis identification system 100 is shown according to the prior art. A management entity 110 oversees a group of sensors in system 100. A chassis information device 122 is coupled to a bus 136 along with other miscellaneous sensors. Prior art FRU memory devices, however, have several disadvantages. First, there is no way for the information in the identification module to be copied to other non-volatile memory for preservation in case the identification module fails. Second, there are no redundant FRU memory devices in case the primary module fails. Third, the bus coupled to the identification module may cause the module to become inoperable should the bus fail for reasons that have nothing to do with the module itself. For these and other reasons, the prior art risks losing crucial chassis identity information so that a system administrator may not be able to determine which system is having a problem from potentially thousands of deployed unmanned systems.

DETAILED DESCRIPTION

Figure 1:
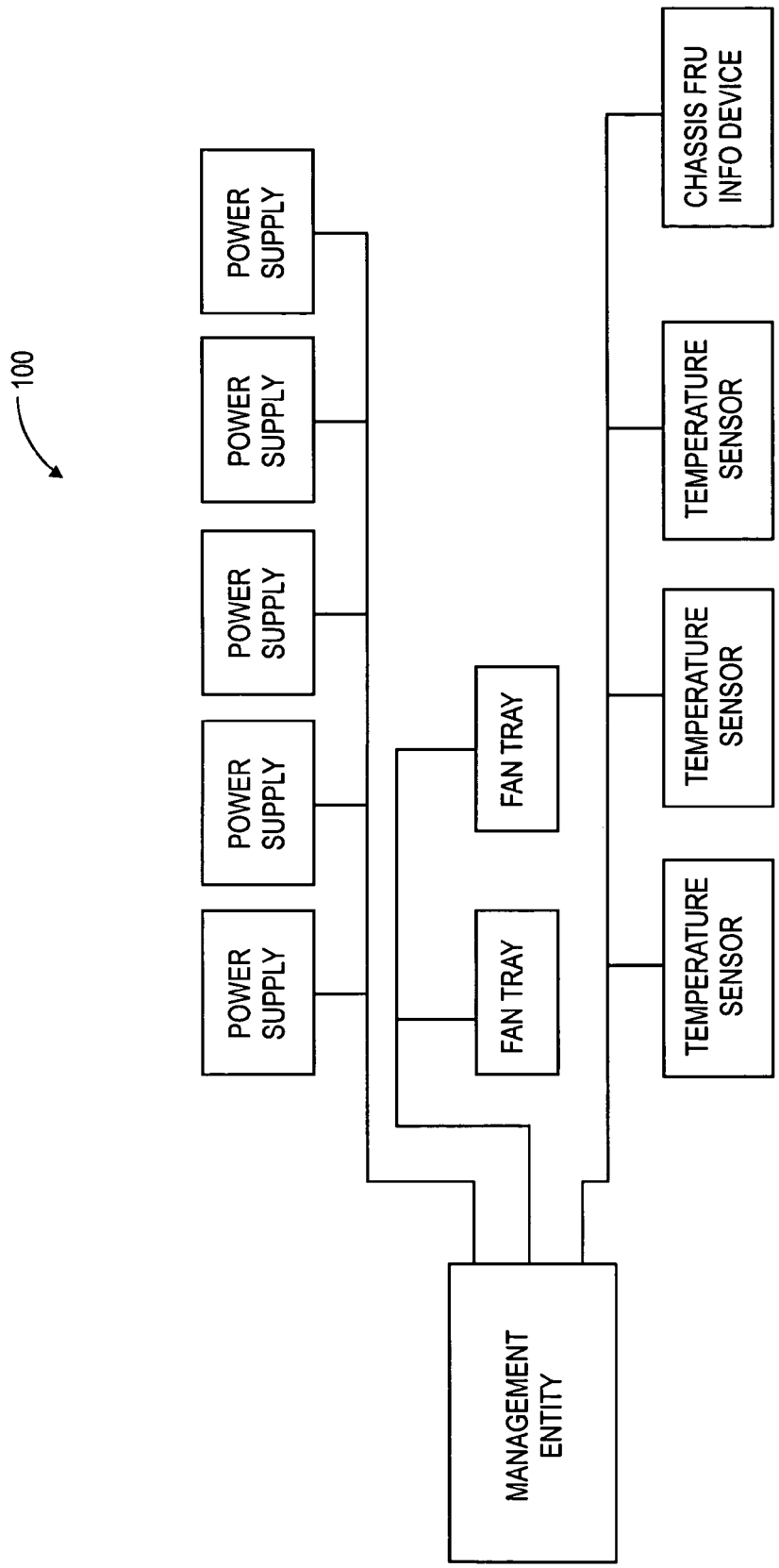
FIG. 1 is a block diagram illustrating a prior art chassis identification system.
Figure 2:
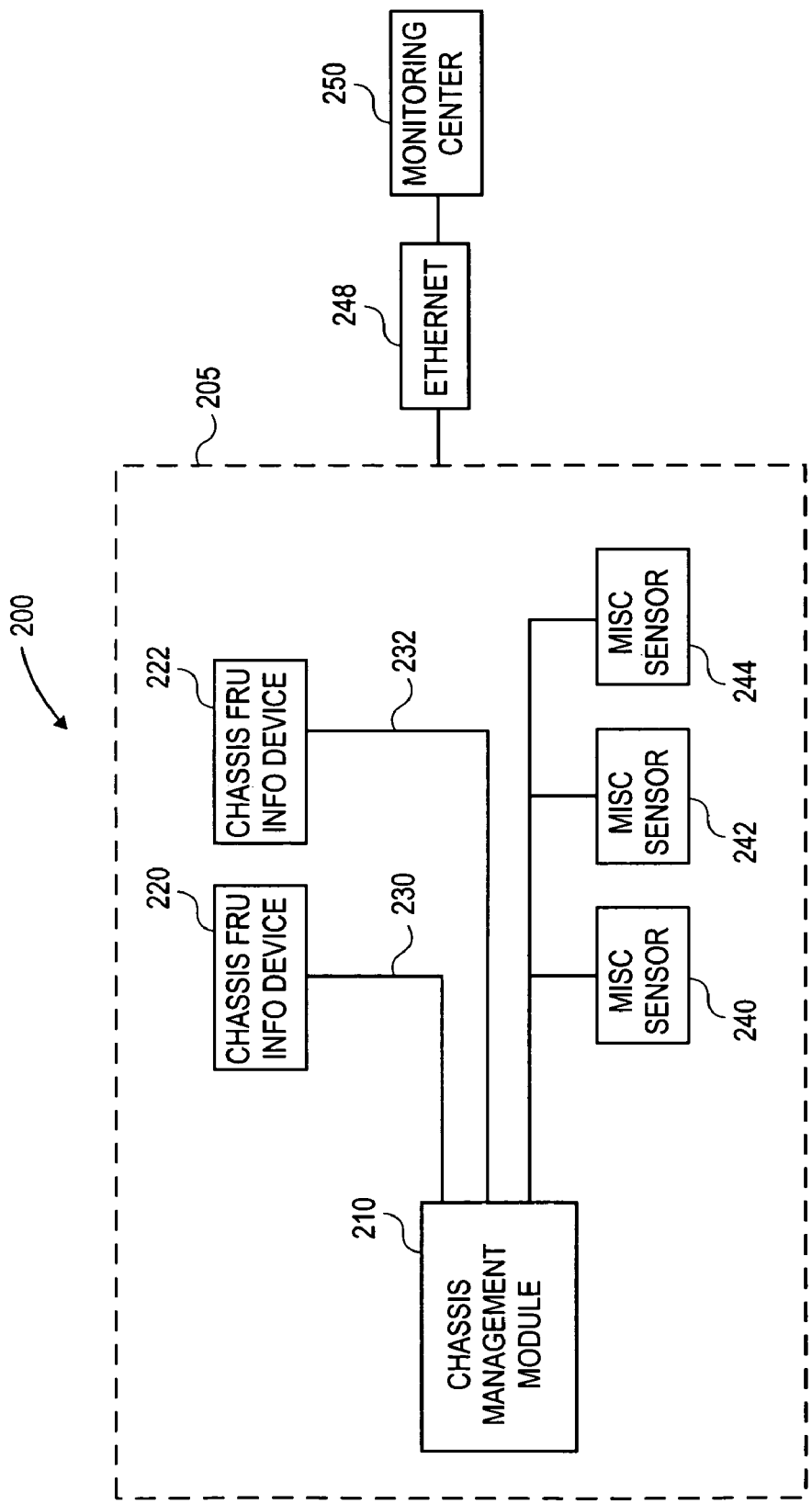
FIG. 2 is a block diagram illustrating a chassis identification system constructed in accordance with one embodiment of the invention.

Referring to FIG. 2, a chassis identification system 200 constructed in accordance with an embodiment of the invention is illustrated. System 200 shows a chassis 205 containing a chassis management module 210, two independent communication buses 230 and 232 for accessing FRU memory devices 220 and 222, and a third communication bus 236 for accessing miscellaneous sensors 240, 242, and 244. If devices 220 and 222 are functioning properly, when a component failure occurs unrelated to devices 220 and 222, the module 210 is configured to log the problem and read the chassis information data from devices 220 and 222 over buses 230 and 232. The module 210 is also configured to send the logged failure and chassis identification information to monitoring center 250 over an external Ethernet 248. If, however, devices 220 and 222 are not functioning properly, module 210 is configured to alert monitoring center 250 over external Ethernet 248 with any logged failures using the latest cached copy of the chassis identification data stored in cache 216. Included in the log will be the failure of the FRU memory devices. Although devices 220 and 222 are identified as field replaceable units, the embodiment is not limited by this fact in that any piece of hardware in chassis 205 can be made so that it is replaceable in the field; i.e., can be a field replaceable unit (FRU).

Chassis management module 210 is configured to read and manage the data stored in chassis FRU memory devices 220 and 222. Module 210 can be implemented in software, firmware, or hardware, such as a baseboard management controller, and is typically located on the main processor board or module. Module 210 also has non-volatile storage, such as, for example, flash memory 214 wherein resides a cache 216 having chassis FRU identification information data from devices 220 and 222. Memory 214 also stores a cache-might-be-stale flag 218. The cache-might-be-stale flag 218 is set to TRUE (i.e., the cache might be stale) at power up. Module 210 has a timer 212 that periodically alerts module 210 to poll devices 220 and 222 to make sure that they are functioning properly. The circuit boards in chassis 205 communicate internally to a backplane in chassis 205 over an internal Ethernet connection (not shown) that adheres to a standard described by PICMG 2.16, CompactPCI Packet Switching Backplane, approved and released Sep. 5, 2001.

If devices 220 and 222 are implemented using 2 kilobit SEEPROMs, the data can be allocated as follows: common header, 8 bytes; internal use area, 72 bytes; chassis information area, 32 bytes; board information area, 64 bytes; product information area, 80 bytes; and multi-record information area, a number of bytes determined by the application.

The common header holds information on overall format specification and offsets to other information areas. The internal use area provides information on other devices that exist on the same FRU. The chassis information area holds serial number, part number, and other information about the system chassis. The board information area holds serial number, part number, and other information about the board the FRU memory device is located on. The product information is present when the FRU exists as a separate product from the system chassis, such as, for example, when the FRU is an add-in card. The multi-record information area is a region that holds one or more records of information covering new information as specified in new industry standards or in proprietary standards.

Communication buses 230 and 232 serve to allow for communication of data between module 210 and devices 220 and 222. Buses 230 and 232 are independent of any other system buses and are coupled to one chassis FRU memory device in FIG. 2. The independence of buses 230 and 232 from other system buses gives FRU memory devices 220 and 222 greater probability of surviving a failure that may occur if another component was installed on the same bus. Although buses 230 and 232 are shown communicating with one FRU memory device, another embodiment of the invention can have more than one FRU memory device on a bus. Buses 230 and 232 can be implemented using single-wire and two-wire communication buses along with related interfaces and protocols, such as, for example, SMBus, IPMB, RS485, and I²C™ bus. (SMBus is the System Management Bus specification designed by Intel in 1995. See SMBus Specification Version 2, published Aug. 3, 2000. IPMB is the Intelligent Platform Management Bus specification, which is one of three specifications comprising IPMI, and set forth in the IPMB Specification, version 1.0, published Nov. 15, 1999. RS485 refers to the Electronics Industry Association (EIA) standard RS485 (ISO 8482) specification, and I²C™ is an Inter-Integrated Circuit bus specification developed by Philips Semiconductors. See "The I²C bus and how to use it (including specifications)", August 1995 Update, published by Philips Semiconducutors.

Other buses 236 in system 200, independent of buses 230 and 232, will have sensors 240, 242, and 244 coupled to them as determined by the particular application for system 200. Sensors 240, 242, and 244 can be, for example, temperature sensors, or other sensors to used to monitor the health of chassis 205. Miscellaneous sensors 240, 242, and 244 can be implemented using any number of devices having interfaces compatible with the buses used in chassis 205.

Chassis FRU memory devices 220 and 222 store chassis information data and are located in a place on the chassis that is not easily accessible by a technician so that devices 220 and 222 cannot be accidentally swapped with other FRU memory devices having the wrong chassis identity. Devices 220 and 222 are implemented using Serial Electrically Erasable Programmable Read Only Memory (SEEPROM) and are individually coupled to buses 230 and 232 using interfaces known to those of ordinary skill in the art.

Figure 3:
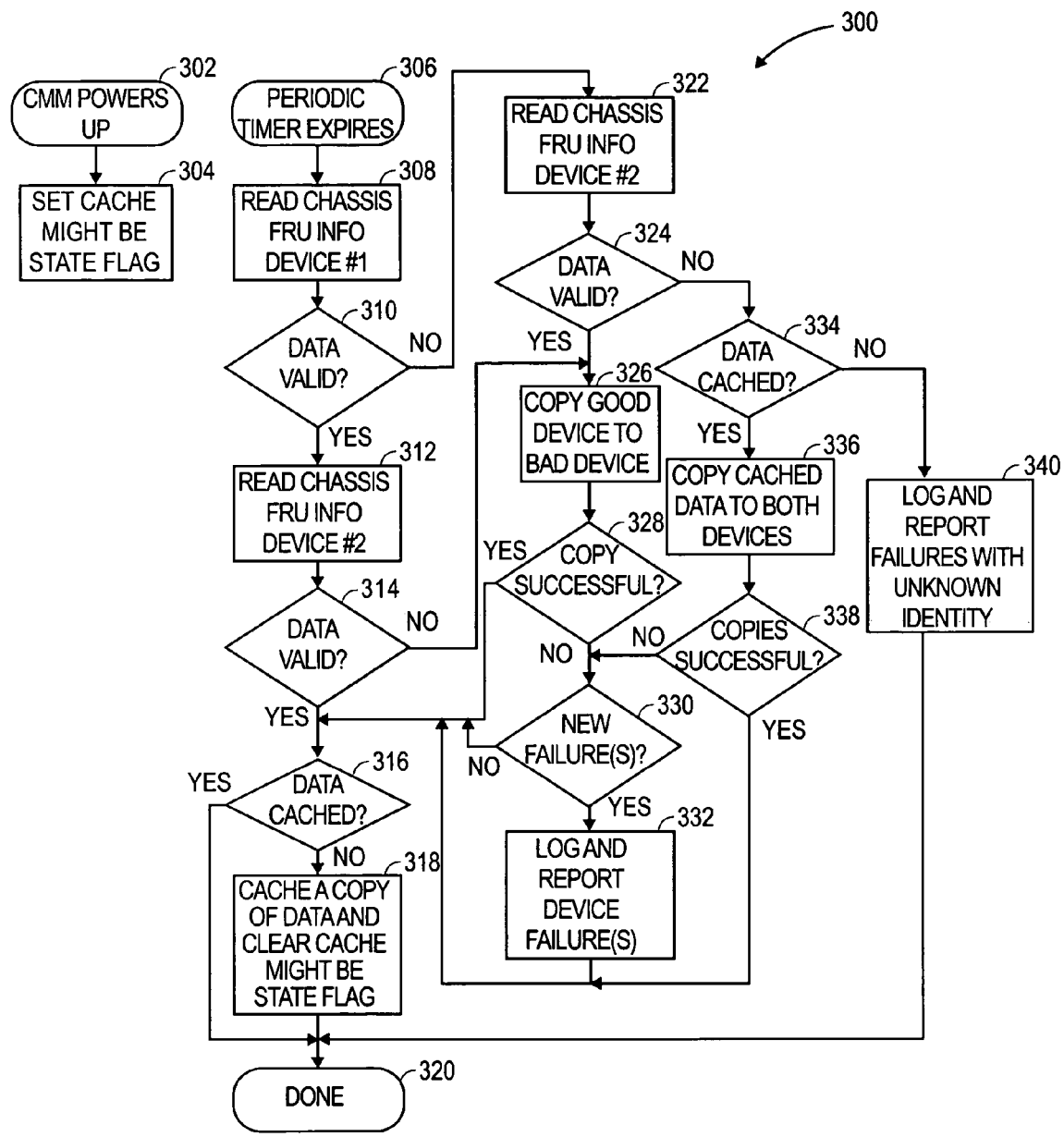
FIG. 3 is a flow diagram illustrating a method of operating the chassis identification system of FIG. 2 in accordance with an embodiment of the invention.

Referring to FIG. 3, a method of operating the system 200 is illustrated. In blocks 302 and 304, power is applied to chassis management module 210 and a cache-might-be-stale flag 218 is set to TRUE. Applying power to module 210 also starts a hardware timer 212 that periodically polls FRU memory devices 220 and 222.

In blocks 306 and 308, the timer 212 expires and module 210 performs a read operation on FRU memory device 220. If the read operation for device 220 is successful, the fitness of the data stored in device 220 is checked in decision block 310 using a checksum algorithm or a cyclic redundancy check (CRC) algorithm performed on the data read out of device 220. If the data from device 220 is successfully read and the data is good, the data is certified as valid. Note that henceforth "valid" data means that the data has been successfully read and has passed the data check operation. "Invalid" data means that either the data has not been successfully read or the data did not pass the data check operation. Module 210 next performs a read operation on device 222 as shown in block 312.

In decision block 314 the data from device 222 is tested for validity. If the data is valid, module 210 checks to determine if a copy of the data stored in devices 220 and 222 have been cached in flash memory 214 so that identification data can be retrieved should devices 220 and 222 fail. If the data has not been cached or the cache-might-be-stale flag 218 is TRUE, the data is cached in block 318 and the cache-might-be-stale flag 218 is set to FALSE. If the data has been cached and the cache-might-be-stale flag 218 is FALSE, the method completes in result block 320 and will restart when the timer 212 informs module 210 that it is time to poll the FRU memory devices again. Note that, henceforth, "cached" data is data that has been cached in flash memory 214 and the cache-might-be-stale flag 318 is FALSE. "Uncached" data means that either the data has not been cached in flash memory 214 or the cache-might-be-stale-flag 318 is TRUE. Chassis identification data is labeled as "uncached" even though data resides in cache 216 if the cache-might-be-stale-flag 318 is TRUE because this data might be stale and incorrect. Unless a fresh, valid copy of data is in cache 216, chassis identification data is deemed to be "uncached."

Referring back to decision block 310, if the data from device 220 is invalid, the method proceeds to block 322 where a data read operation is attempted on device 222. The validity of the data is checked in decision block 324. If the data is valid, in block 326, module 210 copies the data from device 222 into device 220. If the copy is successful in decision block 328, the method goes to decision block 316 and timer 212 resets.

If the copy in decision block 328 is not successful, the method proceeds to decision block 330 where module 210 checks to see if this failure has already been logged in the system 200. If this is a new failure, in block 332 the failure is logged and reported to monitoring station 250. If the failure has already been logged, the method goes to decision block 316 and timer 212 is reset.

Referring back to decision block 324, if the data from device 222 is invalid, in decision block 334 the data is checked to see if it has been cached. If it is cached, the cached data is copied to both device 220 and device 222. If the copy is successful, the method proceeds to decision block 316. If the copy is unsuccessful the method proceeds to decision block 330.

Referring back to decision block 334, if the data is uncached, the failure of devices 220 and 222 is logged in block 340 with unknown chassis identity. Referring back to decision block 314, if the data from device 222 is invalid, the method goes to block 326, where data is copied from device 220 to device 222.

Thus, a system and method for chassis identification has been described. While the method and system of the invention has been described in terms of the above illustrated embodiments, those skilled in the art will recognize that the invention is not limited to the embodiments described. The invention can be practiced with modification and alteration within the spirit and scope of the appended claims. The description is thus to be regarded as illustrative instead of restrictive on the invention.

What is claimed is:

1. A system comprising:
    a non-volatile memory device containing identification data including at least an indicator of whether cache data might be stale;
    a communication bus for the memory device that is independent of any other system bus, wherein the communication bus adheres to a standard described by CompactPCI Packet Switching Backplane (PICMG);
    a controller to manage the integrity of the identification data;
    if a component failure occurs for a field-replicable unit (FRU) memory in a highly available system, logging the failure with chassis identification information from a second memory device.

2. The system of claim 1 wherein the bus is coupled to only the memory device.

3. The system of claim 1 wherein the memory device is an EEPROM.

4. The system of claim 1 wherein the bus is a two-wire bus.

5. The system of claim 1 wherein the bus is a one-wire bus.

6. The system of claim 1 wherein the memory device is a field replaceable unit.

7. The system of claim 1 wherein the controller is a field replaceable unit.

8. The system of claim 1 wherein the controller sends a message to a monitoring center indicating a status of the identification data.

9. The system of claim 1 further comprising a cache that stores a copy of the identification data.

10. A system comprising:
    a plurality of storage means for saving redundant identification data;
    a plurality of communication means coupled to the storage means for reading from and writing to the storage means, each one of the plurality of communication means independently communicating with a corresponding one of the plurality of storage means, wherein if a component failure occurs, logging the failure with chassis identification information from a second memory device; and
    management means coupled to the communications means for managing the integrity of the redundant identification data.

11. The system of claim 10 wherein the communication means is coupled to only the memory storage means.

12. The system of claim 10, wherein the storage means is a memory device.

13. The system of claim 12, wherein the memory device is an EEPROM.

14. The system of claim 10 further comprising a cache that stores a copy of the redundant identification data.

* * * * *